(12) United States Patent
Huang et al.

(10) Patent No.: US 10,367,693 B2
(45) Date of Patent: Jul. 30, 2019

(54) SERVICE CONFIGURATION DATA PROCESSING METHOD AND APPARATUS

(71) Applicant: ZTE CORPORATION, Shenzhen (CN)

(72) Inventors: Wenjie Huang, Shenzhen (CN); Jian Huang, Shenzhen (CN); Chendong Yu, Shenzhen (CN); Mingsheng Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 137 days.

(21) Appl. No.: 15/317,414

(22) PCT Filed: Oct. 23, 2014

(86) PCT No.: PCT/CN2014/089356
§ 371 (c)(1),
(2) Date: Mar. 13, 2017

(87) PCT Pub. No.: WO2015/188563
PCT Pub. Date: Dec. 17, 2015

(65) Prior Publication Data
US 2017/0195184 A1    Jul. 6, 2017

(30) Foreign Application Priority Data
Jun. 9, 2014    (CN) .......................... 2014 1 0252417

(51) Int. Cl.
*H04L 12/24*    (2006.01)
*H04Q 11/00*    (2006.01)
(Continued)

(52) U.S. Cl.
CPC .............. *H04L 41/12* (2013.01); *H04B 10/27* (2013.01); *H04L 41/0806* (2013.01);
(Continued)

(58) Field of Classification Search
CPC ............... H04J 14/0227; H04J 14/0283; H04J 14/0282; H04Q 11/0067; H04Q 11/0062;
(Continued)

(56) References Cited

U.S. PATENT DOCUMENTS 9,699,235 B2 *   7/2017   Matsushima ......... H04L 65/605
2007/0153823 A1 *   7/2007   Wojtowicz ............. H04B 10/40
                                                                              370/463
(Continued)

FOREIGN PATENT DOCUMENTS

CN      101035010      9/2007
CN      101969385      2/2011
(Continued)

OTHER PUBLICATIONS

International Search Report for PCT/CN2014/089356, English Translation attached to original, Both completed by the Chinese Patent Office on Dec. 8, 2014, All together 5 Pages.
(Continued)

*Primary Examiner* — Ted M Wang
(74) *Attorney, Agent, or Firm* — Plumsea Law Group, LLC (57) ABSTRACT

Disclosed are a method for processing service configuration data and apparatus, in the method, it is to obtain a management Internet Protocol (IP) address of a terminal device in which a Small Form-factor Pluggable Optical Network Unit (SFP-ONU) is located; searching for a registered authentication identifier corresponding to the management IP address in a pre-established binding relationship; obtaining service configuration data according to the registered authentication identifier, and distributing the service configuration data to the SFP-ONU, herein the service configuration data is used to start and manage a SFP-ONU service. According to a technical solution provided by the present
(Continued)

disclosure, a binding relationship can be established through a management IP address of a terminal device and authentication and configuration data of a SFP-ONU, so that the SFP-ONU can be conveniently managed and a service channel can be automatically opened in existing x-passive optical network (xPON) applications.

12 Claims, 3 Drawing Sheets

(51) Int. Cl.
*H04B 10/27* (2013.01)
*H04L 29/06* (2006.01)
*H04L 12/26* (2006.01)
*H04L 12/28* (2006.01)

(52) U.S. Cl.
CPC ........ *H04L 41/0886* (2013.01); *H04L 63/083* (2013.01); *H04L 63/0876* (2013.01); *H04Q 11/00* (2013.01); *H04Q 11/0067* (2013.01); *H04L 12/2801* (2013.01); *H04L 43/10* (2013.01); *H04Q 2213/1301* (2013.01)

(58) Field of Classification Search
CPC ........ H04Q 11/00; H04B 10/27; H04L 41/12; H04L 41/0806; H04L 41/0886; H04L 63/083; H04L 63/0876

See application file for complete search history.

(56) References Cited

U.S. PATENT DOCUMENTS

| | | |
|---|---|---|
| 2007/0201486 A1 | 8/2007 | Solomon et al. |
| 2014/0023366 A1 | 1/2014 | Zang et al. |
| 2014/0029934 A1* | 1/2014 | Xia .................... H04B 10/0771 398/20 |

FOREIGN PATENT DOCUMENTS

| | | |
|---|---|---|
| CN | 103532631 | 1/2014 |
| CN | 103812695 | 5/2014 |

OTHER PUBLICATIONS

Extend European Search Report for EP 14894486.1, completed by the European Patent Office on May 8, 2017 All together 8 Pages.

* cited by examiner

SERVICE CONFIGURATION DATA PROCESSING METHOD AND APPARATUS

CROSS-REFERENCE TO RELATED APPLICATION

This application is the U.S. national phase of PCT Application No. PCT/CN2014/089356 filed Oct. 23, 2014, which claims priority to Chinese Application No. 201410252417.7 filed Jun. 9, 2014, the disclosures of which are incorporated in their entirety by reference herein.

TECHNICAL FIELD

The present disclosure relates to the field of communications, and more particularly, to a method for processing service configuration data and apparatus.

BACKGROUND

Figure 1:
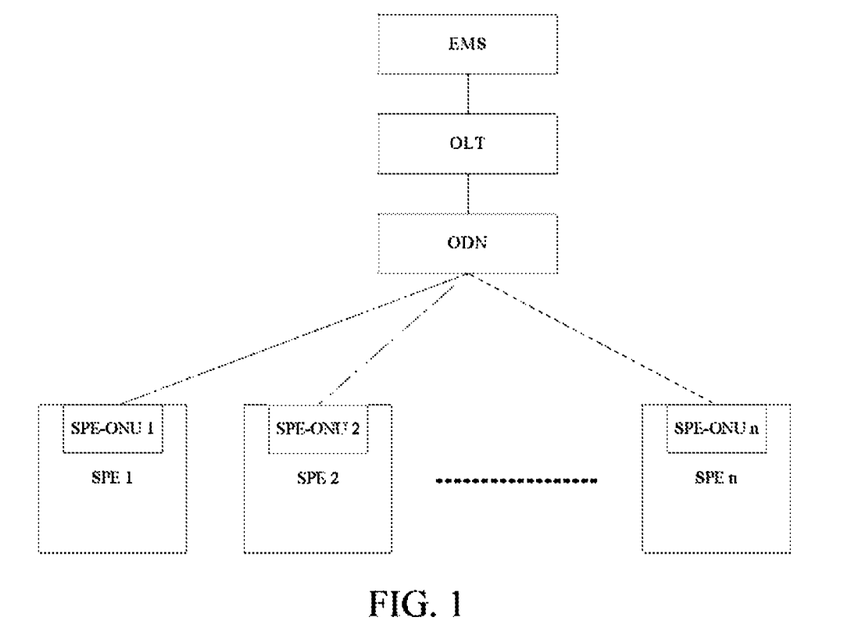
FIG. 1 is a schematic diagram of a system architecture of a common passive optical network in the related art.

At present, the passive optical network devices can be divided into Ethernet Passive Optical Network (EPON) devices, Gigabit-capable Passive Optical Network (G-PON) devices and passive optical network devices based on other working mechanisms (such as: 10GEPON, 10GPON, WDM-PON, etc.) according to working mechanisms. The system architectures of these passive optical network devices are consistent and include an optical line terminal (OLT) and optical network units (ONUs). In passive optical network G-PON/EPON and other passive optical network (PON) operating networks (referred to as xPON), FIG. 1 is a schematic diagram of a system architecture of a common passive optical network in the related art. As shown in FIG. 1, the system may include an element management system (EMS), an OLT, an optical distribution network (ODN), and a plurality of ONUs. The OLT serves as a central terminal device forwarding services to upper-layer devices via a service network-side interface (SNI) and aggregates multiple ONU devices through the ODN network, and the ONU device completes the final access of user services through the user network-side interface (UNI), so as to achieve the functions, such as the transmission and management and configuration of a plurality of services. The xPON network has a point-to-multipoint (PToMP) topology. The transmission direction from the OLT to the ONU is the downstream direction, and the data can be transmitted in the broadcast mode in the downstream direction. The ONU judges whether the data is valid and decides whether to receive or discard the data according to the data identifier; the transmission direction from the ONU to the OLT is the upstream direction, and the upstream direction may adopt Time Division Multiplexing (TDM) or Wavelength Division Multiplexing (WDM) according to different mechanisms. In the time division multiplexing mode, the upstream direction may adopt the time division multiplexing, and the ONU must transmit the upstream burst signal according to the upstream bandwidth allocated by the OLT; in the WDM, the upstream data of ONU is carried in a specific operating wavelength. In the xPON network, a single PON port of the OLT distinguishes and manages each ONU via a unique identifier. In an EPON network, a medium access control (MAC) address is the physical identifier of the ONU. In a GPON network, the serial number (SN) is the physical identifier of the ONU. The ONU is registered in the PON system through the physical identifier, and the logical opening and authentication are performed through the MAC address, the SN, the Logical ONU Identifier (LOID) and the password (PW). Similar identifiers may be used in other PToMP networks for the OLT to distinguish and manage each ONU.

The so-called Small Form Pluggable (SFP)-ONU is a PON ONU using the SFP/SFP+ modularized encapsulation. The external structure of the entire SFP-ONU is similar to an SFP encapsulated optical module, and it can be easily inserted into a mother device (such as a switch or a router) directly as a general optical module, and the power supply is directly supplied by the mother device so that the mother device accesses to the PON network. This design can solve problems of installation space, power arrangement and integrated wiring brought by traditional ONU devices. In addition, with the development of the PON, the SFP-ONU will become a very important form of terminal, and can be used as peripheral devices of user products such as home gateway, mobile terminal device and enterprise gateway, so as to promote a further development of the FTTx market, therefore it will be widely used in scenarios such as mobile bearer/enterprise users.

However, although the SFP-ONU is simple to use, there are drawbacks as follows:

(1) the SFP-ONU and the mother device may not be devices belonging to the same type or the same vendor, and the registration and configuration parameters (These may include but are not limited to at least one of the following parameters: MAC, SN, PW, LOID and DBA) of the ONU in the PON network cannot be set through command lines of the mother device.

(2) The external structure of the SFP-ONU also restricts the management and configuration mode of the SFP-ONU, and it cannot modify the registration and configuration parameters of the SFP-ONU through a general serial interface or a network interface like a traditional ONU device.

(3) In an xPON system, regardless of the MAC of the EPON, the SN of the GPON, the PW/LOID as well as other possible unique identifiers of ONU, they are configuration parameters that must be used for the authentication and registration of xPON ONU. In order to facilitate operations, when a SFP-ONU is out of factory, these authentication parameters may have been written in batches, and the SFP-ONU cannot be identified uniquely. However, the working principle of the xPON requires that the authentication identifier of each ONU must be unique in the same xPON node.

SUMMARY

The embodiment of the present disclosure provides a method for processing service configuration data and apparatus for solving at least the problem in the related art that a SFP-ONU cannot automatically open a service in a passive optical network device.

According to one aspect of the present disclosure, it provides a method for processing service configuration data.

The method for processing service configuration data according to an embodiment of the present disclosure includes: obtaining a management IP address of a terminal device in which a SFP-ONU is located; searching for a registered authentication identifier corresponding to the management IP address in a pre-established binding relationship; obtaining service configuration data according to the registered authentication identifier, and sending the service configuration data to the SFP-ONU, herein the service configuration data is used to open and manage a SFP-ONU service.

Alternatively, said obtaining a management IP address includes: discovering that a SFP-ONU is online; establishing a physical-layer channel with a terminal device in which the SFP-ONU is located; and obtaining the management IP address of the terminal device via the physical-layer channel.

Alternatively, after discovering that the SFP-ONU is online, the method further includes: judging if the SFP-ONU is online for the first time; and if yes, performing a default parameter configuration on the SFP-ONU, herein, the default parameter configuration is used to open the physical-layer channel.

Alternatively, searching for a registered authentication identifier corresponding to the management IP address in a pre-established configuration data table, herein the configuration data table takes different management IP addresses as indexes and records a binding relationship between each management IP address and a registered authentication identifier corresponding to the management IP address.

Alternatively, said obtaining the service configuration data according to the registered authentication identifier includes one of the following: obtaining the service configuration data from a local preset storage area according to the registered authentication identifier; reporting the registered authentication identifier to an EMS, and obtaining the service configuration data from the EMS.

Alternatively, the abovementioned method further includes: forcing the SFP-ONU to go offline and keeping the SFP-ONU in a silent state within a preset period of time in the case that the registered authentication identifier corresponding to the management IP address is not searched out.

According to another aspect of the present disclosure, it provides an apparatus for processing service configuration data.

The apparatus for processing service configuration data according to an embodiment of the present disclosure includes: an obtaining module, arranged to obtain a management IP address of a terminal device in which a SFP-ONU is located; a searching module, arranged to search for a registered authentication identifier corresponding to the management IP addresses in a pre-established binding relationship; a processing module, arranged to obtain service configuration data according to the registered authentication identifier and to send the service configuration data to the SFP-ONU, herein the service configuration data is used for opening and managing a SFP-ONU service.

Alternatively, the obtaining module includes: a discovering unit, arranged to discover that a SFP-ONU is online; an establishing unit, arranged to establish a physical-layer channel with a terminal device in which the SFP-ONU is located; an obtaining unit, arranged to obtain the management IP address of the terminal device via a physical-layer channel.

Alternatively, the obtaining module further includes: a judging unit, arranged to judge whether the SFP-ONU is online for the first time; a configuring unit, arranged to perform a default parameter configuration on the SFP-ONU when the output of the judging unit is yes, herein the default parameter configuration is used to open the physical-layer channel.

Alternatively, the searching module is arranged to search for a registered authentication identifier corresponding to the management IP address in a pre-established configuration data table, herein the configuration data table takes different management IP addresses as indexes and records a binding relationship between each management IP address and a registered authentication identifier corresponding to the management IP address.

Alternatively, the processing module is arranged to obtain the service configuration data from a local preset storage area according to the registered authentication identifier; or report the registered authentication identifier to an EMS and obtain the service configuration data from the EMS.

The embodiment of the present disclosure is used to obtain a management IP address of a terminal device in which a SFP-ONU is located; search for a registered authentication identifier corresponding to the management IP address in a pre-established binding relationship; obtaining service configuration data according to the registered authentication identifier, and sending the service configuration data to the SFP-ONU; herein, the service configuration data is used to open and manage a SFP-ONU service, thereby solving the problem that the SFP-ONU cannot automatically open a service in a passive optical network device in the related art, establishing a binding relationship through the management IP address of the terminal device and the authentication and configuration and other data of the SFP-ONU, and performing a convenient management on the SFP-ONU and an automatic opening of a service channel in existing xPON network applications, which not only meets the operation and maintenance requirements of the xPON network operators, but also meets the interest demands of end-users.

BRIEF DESCRIPTION OF THE DRAWINGS

The accompanying drawings described herein are intended to provide a further understanding of the present disclosure and form a part hereof, the illustrative embodiments of the present disclosure and their description are used to explain the present disclosure and are not construed as limiting the present disclosure. In the accompanying drawings.

SPECIFIC EMBODIMENTS

Hereinafter, in conjunction with the accompanying drawings and embodiments, the present disclosure will be described in detail. It should be noted that, in the case of no conflict, embodiments and features in the embodiments of the present application may be combined with each other.

Figure 2:
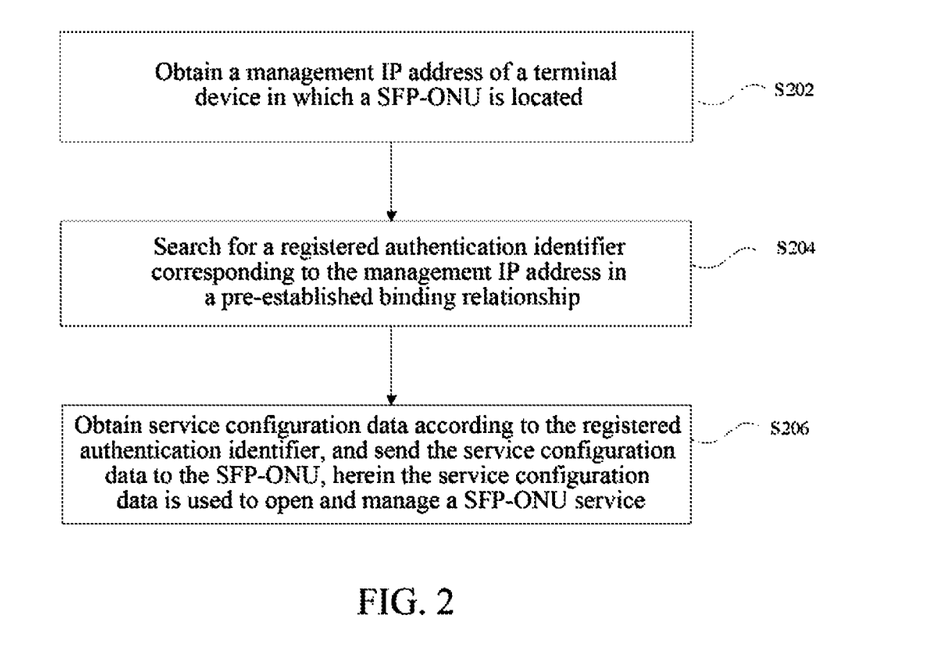
FIG. 2 is a flow chart of a method for processing service configuration data in accordance with an embodiment of the present disclosure.

FIG. 2 is a flow chart of the method for processing service configuration data in accordance with an embodiment of the present disclosure. As shown in FIG. 2, the method may include the following processing steps:

in step S202: it is to obtain a management IP address of a terminal device in which a SFP-ONU is located;

in step S204: it is to search for a registered authentication identifier corresponding to the management IP address in a pre-established binding relationship;

in step S206: it is to obtain service configuration data according to the registered authentication identifier and send the service configuration data to the SFP-ONU, herein the service configuration data is used to open and manage a SFP-ONU service.

the SFP-ONU cannot automatically open a service in a passive optical network device in the related art. The method shown in FIG. 2 is used to bind the service configuration data of the SFP-ONU (including but not limited to the MAC address of the EPON, the SN of the GPON, the PW, LOID and other relevant authentication parameters that can uniquely identify the ONU) with the management IP address of the terminal device in advance; the OLT automatically sends the service configuration data of the bound SFP-ONU according to the management IP address of the terminal device, thus automatically managing and opening a SFP-ONU service in the xPON network, and solving the problem in the related art that the SFP-ONU cannot automatically open a service in the passive optical network device. Therefore, a binding relationship can be established through the management IP address of the terminal device and the authentication and configuration and other data of the SFP-ONU. The SFP-ONU can be conveniently managed and a service channel can be automatically opened in existing xPON network applications, which not only meets operation and maintenance requirements of xPON network operators but also meets interest demands of end-users.

In an implementation process, it may search for a registered authentication identifier corresponding to the management IP address in a pre-established configuration data table, herein the configuration data table takes different management IP addresses as indexes and records a binding relationship between each management IP address and a registered authentication identifier corresponding to the management IP address.

In an embodiment, a configuration data table indexed by the management IP address of a terminal device may be established in an OLT device, the content of the configuration data table is the registered authentication data of the bound related SFP-ONU, herein, the registered authentication data may include but is not limited to, the unique MAC address, SN, PW, LOID and other related authentication parameters, which can uniquely identify the ONU, used for the final authentication and management in the OLT. Then the unique registered authentication identifier can be used to obtain the service configuration data of the ONU from the OLT or its upper-layer EMS, herein the service configuration data may include but is not limited to: service channel related parameters such as the corresponding ONU ID number, logical link identify (LLID), Gem-Port, DBA, and VLAN. In addition, there are also interface physical parameters, such as the interface speed and the working mode, of the corresponding terminal device, as well as other related parameters.

Alternatively, in step S202, said obtaining the management IP address may include the following operations:

in step S1: a SFP-ONU is discovered to be online.

in step S2: it is to establish a physical-layer channel with a terminal device in which the SFP-ONU is located;

in step S3: it is to obtain a management IP address of the terminal device via the physical-layer channel.

Alternatively, after the SFP-ONU is discovered to be online in step S1, the following steps may also be included:

in step S4: it is to judge whether the SFP-ONU is online for the first time;

in step S5: if yes, it is to perform a default parameter configuration on the SFP-ONU, herein, the default parameter configuration is used to open a physical-layer channel.

In an embodiment, the ONU discovery process on the OLT side is started. If the SFP-ONU is online for the first time, because the authentication key information, such as the corresponding out-of-factory MAC address or SN number, cannot be searched out in the configuration data table, the default out-of-factory MAC address or SN is used to temporarily register and authenticate to the OLT. The OLT performs a default parameter configuration on the ONU according to a non-configured ONU registration method, herein, it may include but is not limited to: configuration of default service channel parameters such as a temporary ONU ID, LLID, or GemPort, DBA, so as to ensure that a xPON physical channel between the OLT and the terminal device is opened.

Alternatively, in step S206, said obtaining the service configuration data according to the registered authentication identifier may include one of the following ways:

way one: obtaining service configuration data from a local preset storage area according to a registered authentication identifier;

way two, reporting the registered authentication identifier to the EMS, and obtaining the service configuration data from the EMS.

In the embodiment, once the management IP address of the current terminal device is obtained and the registered authentication identifier of the SPF-ONU bound thereto is obtained from the configuration data table, all the service configuration data can be obtained from the OLT according to the registered authentication identifier, or the OLT reports the registered authentication identifier of the SFP-ONU to the upper-layer EMS, and it obtains the service configuration data of the SFP-ONU from the EMS via the MIB interface, and the OLT sends the corresponding service configuration data to the ONU. The key parameters (which may include but are not limited to configuration parameters such as new MAC or SN) related to the authentication are written and stored into the SPF-ONU. After that, all the new configuration information takes effect immediately by restarting or directly modifying the configuration of the SFP-ONU. Through the abovementioned method, the terminal device can establish a channel to the device on the network side through the xPON network, so as to automatically open a SFP-ONU service.

After the SFP-ONU whose configuration is completed is powered on again or restarted, the configuration data table can be directly retrieved according to the authentication configuration information such as the corresponding MAC or SN, so as to perform the service configuration of the ONU ID, LLID or GemPort, DBA, so as to quickly implement the re-establishment of the SFP-ONU service channel.

Alternatively, the abovementioned method may further include the following operations:

in step S6: in the case that the registered authentication identifier corresponding to the management IP address is not searched out, the SFP-ONU is forced to go offline and the SFP-ONU is controlled to be in the silent state within a preset period of time.

In an embodiment, the OLT obtains its management IP address from the terminal device by using a message transmission or a specific protocol interaction method via the configured default LLID or GemPort channel, and if a correct response from the terminal device can be received, the configuration data table of the SFP-ONU corresponding to the management IP address can be found; if a correct response from the terminal device is not received, it illustrates that the terminal device is not in the configuration data table of the OLT, therefore, the OLT can directly force the SFP-ONU to go offline and keep it silent for a period of time after completing the event and time recording.

In the following, the embodiment shown in FIG. 3 will be used to describe the abovementioned implementation process in further detail.

Figure 3:
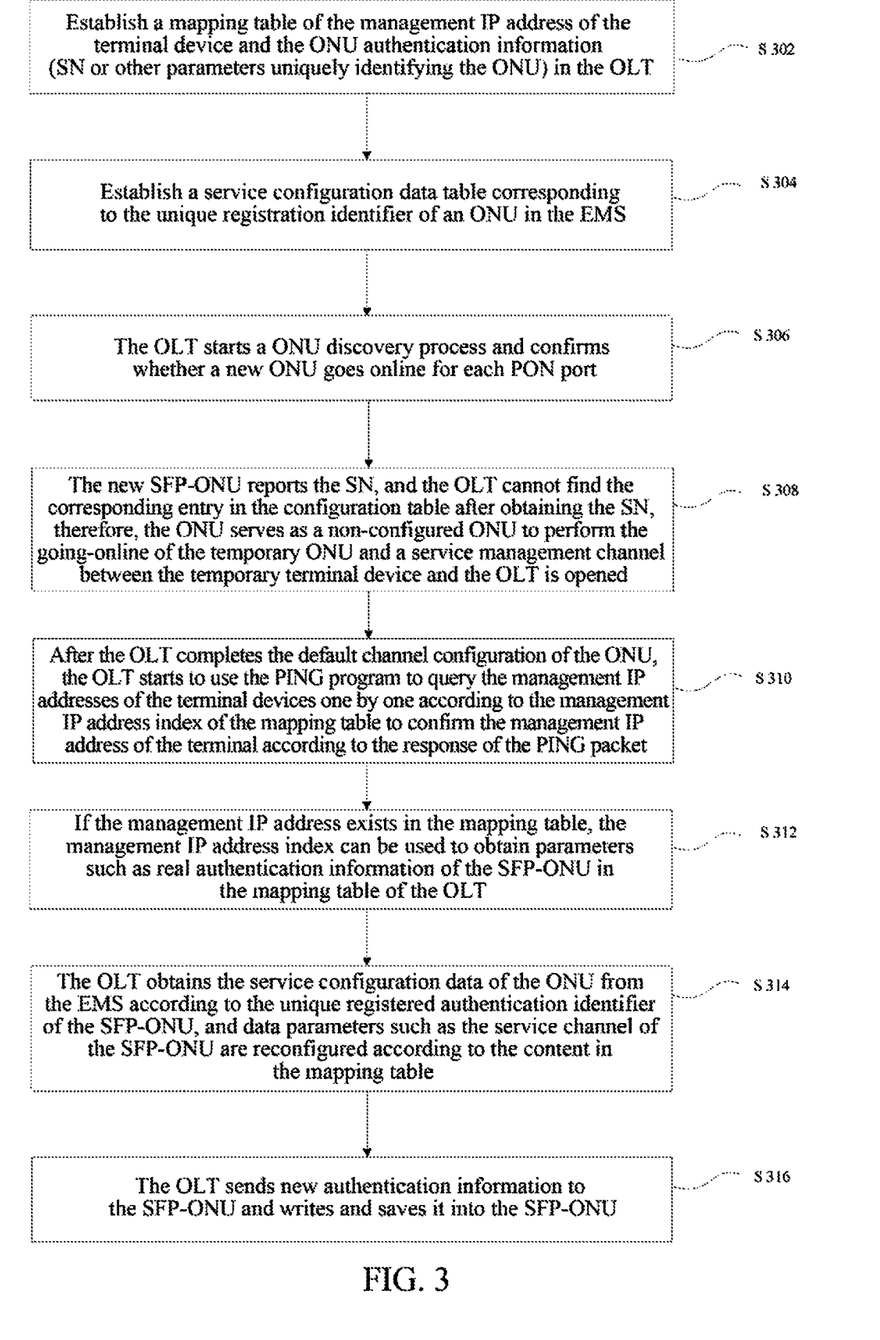
FIG. 3 is a flow chart of a method for automatically managing and opening a SFP-ONU service in an xPON network in accordance with an embodiment of the present disclosure.

FIG. 3 is a flow chart of a method for automatically managing and opening a SFP-ONU service in an xPON network in accordance with an embodiment of the present disclosure. The embodiment has still been completed based on the system architecture shown in FIG. 1. The EMS is responsible for configuring, managing and maintaining the OLT and the xPON network; and it is configured with a mapping relationship table of authentication information, such as the MAC address of the SFP-ONU, the SN or other authentication information uniquely identifying the ONU, and its configuration data, and the configuration data of the ONU is sent according to the registered authentication identifier finally configured by the SFP-ONU, thus automatically opening the SFP-ONU service. The OLT is configured with a mapping table of the management IP address of the terminal device and authentication information, such as the MAC address of the SFP-ONU, the SN or other identification information uniquely identifying the ONU, and the OLT is responsible for starting the online discovery process of the ONU, obtaining the management IP address of the terminal device, and controlling the SFP-ONU to accomplish a correct authentication process according to the mapping relationship, and then obtaining the service configuration data of the ONU from the OLT or the EMS to perform an automatic service configuration according to the registered authentication identifier of the SFP-ONU, so as to implement the management and configuration of the SFP-ONU. The ODN is responsible for connecting different numbers of SFP-ONUs under the PON port corresponding to the OLT as a direct physical connection channel between the OLT and the SFP-ONU, and it may be composed of multiple passive optical physical equipments and their connection cables. The SFP-ONU is responsible for playing the role of accessing the terminal device to the xPON network, accepting the management of the OLT and establishing a service channel according to the configuration sent by the OLT. The SPE (i.e., the abovementioned terminal device) is a terminal device implementing the service application and planning management on the user side, such as a home gateway, a mobile terminal device, or an enterprise gateway. As shown in FIG. 3, the service data can be obtained from the EMS, and a common PING program can be adopted to obtain the management IP address of the terminal device between the OLT and the terminal device. The process may include the following processing steps:

In step S302: it is to establish a mapping table of the management IP address of the terminal device and the ONU authentication information (SN or other parameters uniquely identifying the ONU) in the OLT, herein the mapping table may include authentication-related parameters such as SN or PW/LOID of the final authentication and management.

In step S304, it is to establish a service configuration data table corresponding to the unique registration identifier of an ONU in the EMS, herein the service configuration data table may include but is not limited to: service channel related parameters such as an ONU ID number, a Gem-Port, a DBA and a VLAN, port physical parameters such as an interface speed and a working mode of the corresponding terminal device, and other related parameters.

In step S306: The OLT starts the ONU discovery process and confirms whether a new ONU is online for each PON port.

If it is the ONU ID that has been registered and authenticated successfully (the SN has already exists in the mapping table), the direct registration succeeds and the service is configured and opened according to the original data; if the PON port does not include the corresponding identification information, the ONU is considered as a new ONU.

In step S308: the new SFP-ONU reports the SN, and the OLT cannot find the corresponding entry in the configuration table after obtaining the SN, therefore, the ONU serves as a non-configured ONU, and the going-online (a temporary ONU ID is assigned) and a default service channel configuration (GemPort, DBA, VLAN, etc.) of a temporary ONU are performed, and a service management channel between the temporary terminal device and the OLT is opened.

In step S310: after the OLT completes the default channel configuration of the ONU, the PING program is started to be used to query the management IP addresses of the terminal devices one by one according to the management IP address index of the mapping table to confirm the management IP address of the terminal according to the response of the PING packet.

In step S312: if the management IP address exists in the mapping table, the management IP address index can be used to obtain parameters such as real authentication information of the SFP-ONU in the mapping table of the OLT. Otherwise, the terminal device can be regarded as a device that does not really need the access, and the OLT directly forces the SFP-ONU to go offline and keep the ONU to be in the silent state for a period of time.

In step S314: the OLT obtains the service configuration data of the ONU from the EMS, element management system, according to the unique registered authentication identifier of the SFP-ONU, and reconfigures data parameters such as the service channel of the SFP-ONU according to the content in the mapping table.

In step S316: the OLT sends new authentication information to the SFP-ONU and writes and saves it into the SFP-ONU, so that when the ONU restarts or goes online for the next time, it can be online faster and more succinctly according to the new authentication information, thereby finally implementing the opening of a correct service channel of the ONU, and really accessing the terminal device to the upper-layer device through the xPON network.

Figure 4:
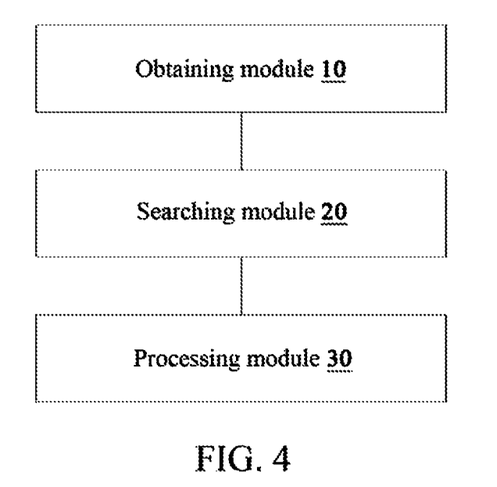
FIG. 4 is a structural diagram of an apparatus for processing service configuration data in accordance with an embodiment of the present disclosure.

FIG. 4 is a structural diagram of the apparatus for processing service configuration data in accordance with an embodiment of the present disclosure. The apparatus may be provided in an OLT. As shown in FIG. 4, the apparatus for processing service configuration data may include an obtaining module 10, arranged to obtain a management IP address of a terminal device in which the SFP-ONU is located; a searching module 20, arranged to search for a registered authentication identifier corresponding to the management IP address in a pre-established binding relationship; a processing module 30, arranged to obtain service configuration data according to the registered authentication identifier and send the service configuration data to the SFP-ONU, herein the service configuration data is used to open and manage a SFP-ONU service.

The apparatus shown in FIG. 4 can be used to solve the problem that a SFP-ONU cannot automatically open a service in a passive optical network device in the related art, therefore, a binding relationship can be established through the management IP address of the terminal device and the authentication and configuration and other data of the SFP-ONU, so as to conveniently manage the SFP-ONU as well as automatically open a service channel in existing xPON network applications, which not only meets the operation and maintenance requirements of the xPON network operators, but also meets the interest demands of the end-users.

Figure 5:
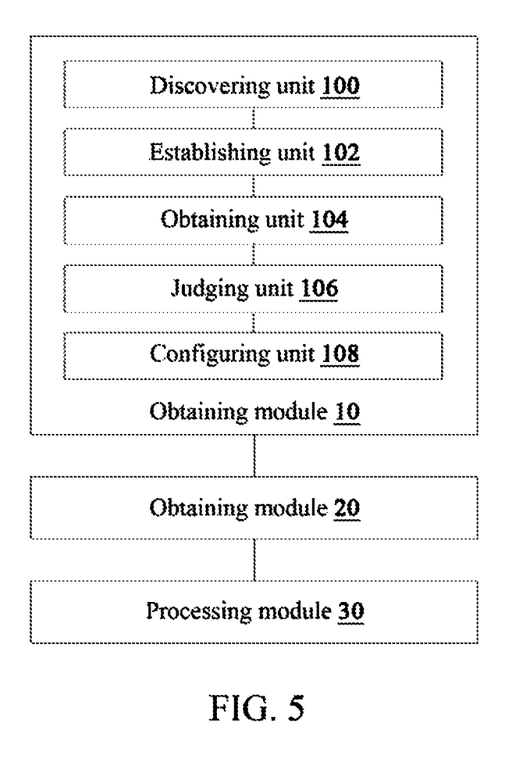
FIG. 5 is a structural diagram of the apparatus for processing service configuration data in accordance with an embodiment of the present disclosure.

Alternatively, as shown in FIG. 5, the obtaining module 10 may include a discovering unit 100, arranged to discover that a SFP-ONU is online; an establishing unit 102, arranged to establish a physical-layer channel with a terminal device in which the SFP-ONU is located; an obtaining unit 104, arranged to obtain the management IP address of the terminal device via the physical-layer channel.

Alternatively, as shown in FIG. 5, the obtaining module 10 may further include a judging unit 106, arranged to judge whether the SFP-ONU is online for the first time; a configuring unit 108, arranged to perform a default parameter configuration on the SFP-ONU when the output of the judging unit is yes, herein the default parameter configuration is used to open the physical-layer channel.

Alternatively, the searching module 20 is arranged to search for a registered authentication identifier corresponding to the management IP address in a pre-established configuration data table, herein the configuration data table takes different management IP addresses as indexes and records a binding relationship between each management IP address and a registered authentication identifier corresponding to the management IP address.

Alternatively, the processing module 30 is arranged to obtain service configuration data from a local preset storage area according to the registered authentication identifier, or, to report the registered authentication identifier to the EMS and obtain the service configuration data from the EMS.

From the above description, it can be seen that the abovementioned embodiments achieve the following technical effects (it should be noted that these effects are effects that can be achieved by some embodiments): the embodiments of the present disclosure binds the service configuration data of the SFP-ONU (may include but are not limited to the MAC address of the EPON, the SN of the GPON, the PW, the LOID, and other related authentication parameters that uniquely identify the ONU) with the management Internet Protocol (IP) address of the terminal device in a passive optical network. After the SFP-ONU first goes online and establishes a management channel according to the original factory setting, the OLT automatically sends the service configuration data of the bound SFP-ONU according to the management IP address of the terminal device, thus achieving the method for automatically managing and opening a SFP-ONU service in an xPON network. In this way, a binding relationship is established through the management IP address of the terminal device and the authentication and configuration and other data of the SFP-ONU, and the SFP-ONU can be conveniently managed and the service channel can be automatically opened in the existing xPON network applications, which not only meets the operation and maintenance needs of the xPON network operators, but also meets the interest demands of the end-users.

Apparently, those skilled in the art should understand that various modules or steps of the present disclosure described above may be implemented by general-purpose computing apparatuses that may be centralized on a single computing apparatus or distributed over a network composed of a plurality of computing apparatuses, alternatively, they may be implemented with program codes executable by the computing means so that they may be stored in the storage means and executed by the computing means, and in some cases, the steps shown or described herein may be performed in an order different from what is shown herein, or they can be made separately into individual integrated circuit modules, or a plurality of modules or steps therein can be made into a single integrated circuit module. Thus, the present disclosure is not limited to any particular combination of hardware and software.

The above description is only embodiments of the present disclosure and is not intended to limit the present disclosure, and for those skilled in the art, the present disclosure may have various changes and modifications. Any modifications, equivalent substitutions, improvements and the like made within the spirits and principles of the present disclosure are intended to be included in the protection scope of the present disclosure.

INDUSTRIAL APPLICABILITY

As described above, the method for processing service configuration data and apparatus provided in the embodiment of the present disclosure have the following beneficial effects: establishing a binding relationship through a management IP address of a terminal device and authentication and configuration and other data of a SFP-ONU, and performing a convenient management on the SFP-ONU and an automatic opening of a service channel in existing xPON network applications, which not only meets operation and maintenance requirements of xPON network operators, but also meets interest demands of end-user.

What is claimed is:

1. A method for processing service configuration data, comprising:
    obtaining a management Internet Protocol, IP, address of a terminal device in which a Small Form Pluggable-optical network unit, SFP-ONU, is located;
    searching for a registered authentication identifier corresponding to the management IP address in a pre-established binding relationship;
    obtaining service configuration data according to the registered authentication identifier, and sending the service configuration data to the SFP-ONU, wherein the service configuration data is used to open and manage a SFP-ONU service;
    wherein, searching for a registered authentication identifier corresponding to the management IP address includes searching a pre-established configuration data table, wherein, the configuration data table takes different management IP addresses as indexes and records a binding relationship between each management IP address and the registered authentication identifier corresponding to the management IP address.

2. The method of claim 1, wherein, said obtaining the management IP address comprises:
    discovering that the SFP-ONU is online;
    establishing a physical-layer channel with the terminal device in which the SFP-ONU is located;
    obtaining the management IP address of the terminal device via the physical-layer channel.

3. The method of claim 2, wherein, after discovering that the SFP-ONU is online, the method further comprises:
    judging if the SFP-ONU is online for the first time;
    if yes, performing a default parameter configuration on the SEP-ONU, wherein, the default parameter configuration is used to open the physical-layer channel.

4. The method of claim 3, wherein, the method further comprises:

forcing the SFP-ONU to go offline and keeping the SFP-ONU in a silent state within a preset period of time in the case that the registered authentication identifier corresponding to the management IP address is not searched out.

5. The method of claim 2, wherein, the method further comprises:
forcing the SFP-ONU to go offline and keeping the SFP-ONU in a silent state within a preset period of time in the case that the registered authentication identifier corresponding to the management IP address is not searched out.

6. The method of claim 1, wherein, said obtaining the service configuration data according to the registered authentication identifier comprises one of the following:
obtaining the service configuration data from a local preset storage area according to the registered authentication identifier;
reporting the registered authentication identifier to an element management system, EMS, and obtaining the service configuration data from the EMS.

7. The method of claim 6, wherein, the method further comprises:
forcing the SFP-ONU to go offline and keeping the SFP-ONU in a silent state within a preset period of time in the case that the registered authentication identifier corresponding to the management IP address is not searched out.

8. The method of claim 1, wherein, the method further comprises:
forcing the SFP-ONU to go offline and keeping the SFP-ONU in a silent state within a preset period of time in the case that the registered authentication identifier corresponding to the management IP address is not searched out.

9. An apparatus for processing service configuration data, comprising hardware performing instructions stored in a non-transitory computer readable medium which executes steps in following modules:
an obtaining module, arranged to obtain a management IP address of a terminal device in which a SFP-ONU is located;
a searching module, arranged to search for a registered authentication identifier corresponding to the management IP addresses in a pre-established binding relationship;
a processing module, arranged to obtain service configuration data according to the registered authentication identifier and to send the service configuration data to the SFP-ONU, wherein the service configuration data is used for opening and managing a SFP-ONU service;
wherein, the searching module is arranged to search for a registered authentication identifier corresponding to the management IP address in a pre-established configuration data table, wherein the configuration data table takes different management IP addresses as indexes and records a binding relationship between each management IP address and the registered authentication identifier corresponding to the management IP address.

10. The apparatus of claim 9, wherein, the obtaining module comprises:
a discovering unit, arranged to discover that the SFP-ONU is online;
an establishing unit, arranged to establish a physical-layer channel with the terminal device in which the SFP-ONU is located;
an obtaining unit, arranged to obtain the management IP address of the terminal device via the physical-layer channel.

11. The apparatus of claim 10, wherein, the obtaining module further comprises:
a judging unit, arranged to judge whether the SFP-ONU is online for the first time;
a configuring unit, arranged to perform a default parameter configuration on the SFP-ONU when an output of the judging unit is yes, wherein, the default parameter configuration is used to open the physical-layer channel.

12. The apparatus of claim 9, wherein, the processing module is arranged to obtain the service configuration data from a local preset storage area according to the registered authentication identifier; or report the registered authentication identifier to an element management system, EMS, and obtain the service configuration data from the EMS.

* * * * *